Patented May 24, 1938

2,118,674

UNITED STATES PATENT OFFICE 2,118,674

RECOVERING TRIMETHYLAMINE

Paul Herold and Werner Wustrow, Leuna, Germany, assignors to I. G. Farbenindustrie Aktiengesellschaft, Frankfort-on-the-Main, Germany No Drawing. Application November 30, 1934, Serial No. 755,416. In Germany December 8, 1933

6 Claims. (Cl. 202—42)

The present invention relates to a process of recovering trimethylamine.

In the industrial manufacture of methylamines by the catalytic conversion of methanol with ammonia, there is formed in the separation of the reaction product by distillation a mixture of ammonia and trimethylamine from which the two components cannot be recovered by fractional distillation alone because trimethylamine forms an azeotropic mixture with ammonia. (The composition of the azeotropic mixture varies somewhat in dependance on the pressure; while the azeotropic mixture distilling under 100 millimeters mercury gauge contains about 34 per cent by weight of trimethylamine, the azeotropic mixture under 10 atmospheres contains 25 per cent by weight and under 90 atmospheres 20 per cent by weight of trimethylamine. In view of the very slight difference between the boiling points of ammonia and of the azeotropic ammonia-trimethylamine mixture, in practice often mixtures are obtained containing somewhat more ammonia than corresponds to the exact composition of the azeotropic mixture; for example when a large excess of ammonia is present and the distillation is carried out under 10 atmospheres usually a mixture containing about 20 per cent by weight of trimethylamine is obtained.) Trimethylamine can therefore only be recovered from such mixtures with ammonia by distillation when the trimethylamine is present in an excess over the amount that is necessary to form the azeotropic mixture.

We have now found that mixtures of trimethylamine and ammonia (in the free state or in the form of salts) which contain high proportions of ammonia, preferably amounts equal to or even greater than corresponds to the azeotropic mixture, can be worked up in an advantageous manner by adjusting the basicity of the said mixtures so that the said bases are incompletely neutralized and subjecting the non-neutralized part to fractional distillation, if desired after separation from the neutralized part. The fractional distillation is preferably carried out under pressure for example up to 100 atmospheres and preferably at ordinary or slightly decreased or slightly increased temperatures (up to about 100° C.). If trimethylamine and ammonia are present in the starting mixture in the form of salts, the desired basicity is produced by the addition of alkali, for example of caustic soda or potash, the alkali being employed in amounts insufficient for setting free the total amount of trimethylamine and ammonia. If, as is usually the case, trimethylamine and ammonia are present in the free state in the initial mixture, the latter is treated with an amount of acid insufficient for complete neutralization. It has been found that by employing a restricted amount of acid for the neutralization it is mainly the ammonia which combines therewith. As the amount of acid increases, trimethylamine is converted into the corresponding salt in an increasing amount. In practice it is therefore preferable to employ a smaller amount of acid than is necessary for combination with all of the ammonia. Thus it can readily be arranged that the resulting neutralized part of the basic material contains practically only ammonia while from the remaining mixture of free ammonia and free trimethylamine a more or less large fraction of the trimethylamine may be recovered in a pure form by distillation under pressure. By employing larger amounts of acid it may be arranged that the non-combined portion of the mixture consists practically entirely of trimethylamine. In this case the salt contains not only salts of ammonia but more or less large amounts of trimethylamine salts.

In order to prepare a salt as free as possible from trimethylamine on the one hand and to recover trimethylamine in as pure a form as possible on the other hand it is preferable in practice to be content with recovering only a certain part of the trimethylamine in a highly concentrated form in one operation. The remaining part of the trimethylamine is separated in the form of an azeotropic mixture with ammonia after the treatment with acid but before the recovery of the trimethylamine and is further worked up in another operation. For example, in the case of a mixture consisting of about four fifths of ammonia and about one fifth of trimethylamine, only so much acid is added as is necessary for the neutralization of about half of the mixture. In the subsequent distillation, preferably under pressure, there is first obtained the azeotropic mixture of ammonia and trimethylamine which contains the remainder of the ammonia and about half of the trimethylamine, and then the remainder of the trimethylamine distills over in the form of a product of high purity. The residual salt mixture contains only negligible amounts of trimethylamine and may be worked up in known manner into solid ammonium salts.

The azeotropic mixture, for the purpose of further separation, is preferably again subjected to the acid treatment if desired in admixture with fresh initial material.

Both inorganic and organic acids are suitable for the purposes of the present invention. It is preferable to employ acids, the ammonium salts of which have at the most only a low decomposition pressure at the distillation temperatures which usually range between ordinary or somewhat lower temperatures and about 100° C. For example hydrochloric acid, hydrobromic acid, sulphuric acid, phosphoric acid, dodecane sulphonic acid and benzene sulphonic acid may be employed. When employing carbon dioxide it is preferable, however, by reason of the volatility of the resulting ammonium carbonate to convert the same during its preparation or in any case before the distillation by means of calcium sulphate into non-volatile ammonium sulphate, calcium carbonate being formed as a by-product.

The treatment of the mixture of bases with acids may be carried out at atmospheric pressure by leading the gaseous mixture into the comparatively strongly concentrated acids. For example sulphuric acid may be employed in concentrations of 30, 40, 90 or 98 per cent. It is preferable to take precautions for preventing that the reaction mixture is partly or wholly heated to temperatures above 100° C.; this may be effected for example by efficient cooling and good mixing. Temperatures from ordinary or somewhat lower temperatures up to about 100° C. are suitable. The introduction of the gaseous mixture is interrupted when the mixture of bases remains for the most part unabsorbed. It is preferable to work in such a manner that the unabsorbed part of the gas mixture contains more than about 30 per cent. The process may also be carried out continuously while employing a trickling tower. In this case it is preferable to cause an acidified highly concentrated aqueous solution of the ammonium salt of the same acid to flow in the hot state together with the acid down through the tower while the gaseous mixture of trimethylamine and ammonia flows upwards in counter-current. A part of the hot salt solution leaving the tower at the bottom is separated and worked up in any suitable manner while the remainder is mixed with acid, if desired after cooling, and supplied again to the tower. The working conditions are adjusted so that about half of the gaseous mixture of trimethylamine and ammonia introduced into the tower leaves the latter unabsorbed; the temperature is preferably kept between about 40° and 80° C. The proportion of the gaseous mixture and the absorption liquid is preferably varied according to the concentration of the latter; for example if a from 30 to 40 per cent sulphuric acid is employed it is suitable to pass through the tower from 300 to 500 parts by volume of the gaseous mixture per each volume of the absorption liquid.

It is especially advantageous to carry out the process under pressure, the mixture of bases being present in the liquid phase, because in this case the resulting product may be subjected directly to distillation without any compression being necessary. The absolute pressure prevailing in the reaction vessel depends essentially on the partial pressure of the ammonia in the ammonia trimethylamine mixture to be treated and on the temperature of the cooling water available for the distillation. When working discontinuously it is recommended that the pressure vessel be constructed so that it is at the same time the still of a pressure distillation column, the column with a dephlegmator serving as a reflux condenser when the mixture is caused to boil by reason of the heat of neutralization produced when the acid is introduced into the mixture of bases. While the fractional distillation is usually carried out under the pressure developed by the mixture itself at the distillation temperature, it is possible to add inert gas such as nitrogen or hydrogen. In this case still higher pressures may be used, for example pressures above 100 atmospheres.

The following examples will further illustrate the nature of this invention but the invention is not restricted to this example. The parts are by weight.

*Example 1*

800 kilograms of a liquid mixture of 75 parts of ammonia and 25 parts of trimethylamine are introduced into the still of a pressure distillation column and then 2220 kilograms of 40 per cent sulphuric acid are pressed in, a little at a time. At the same time a powerful stream of cooling water is caused to flow through the spiral situated in the still as well as through the dephlegmator in the distillation column; the condenser is, however, warmed slightly. When all the acid has been introduced the still is heated by the passage of steam through the spiral therein, while cooling water is caused to flow slowly through the condenser. While there is a good reflux, 380 kilograms of the azeotropic mixture of ammonia and trimethylamine passes over under a pressure of 12 atmospheres the content of trimethylamine being 25 per cent. With a marked fall in pressure there then passes over an intermediate fraction of 10 kilograms having a content of 53 per cent of trimethylamine and finally, at 1.6 atmospheres, 74 kilograms of 98 per cent trimethylamine pass over.

2540 kilograms of a 46 per cent solution of ammonium sulphate containing only traces of trimethylamine remain in the still and may be worked up into solid ammonium sulphate.

The azeotropic mixture distilled off which consists of a mixture of ammonia and trimethylamine and contains about half of the trimethylamine in the original mixture is mixed with the mixture of ammonia and trimethylamine employed as the initial material and again subjected to the process.

*Example 2*

100 kilograms of 40 per cent sulphuric acid are allowed to flow slowly down through a washing tower filled with Raship rings and provided with a cooling device while in the same period of time 50 kilograms of a vaporous mixture of 75 parts of ammonia and 25 parts of trimethylamine flow upward through the tower. The temperature is adjusted by cooling to about 75° C. so that only small amounts of free bases leave the tower together with the salt solution.

The mixture of bases leaving the tower in the vaporous state through a reflux condenser is dried (for example by passing it over calcium oxide) and condensed by cooling to low temperature (for example 80° below zero C.) and then subjected to fractional distillation in a column under ordinary pressure. At 35° below zero C. a mixture of 8 kilograms of ammonia and 3 kilograms of trimethylamine distills over and 4 kilograms of pure trimethylamine are obtained as distillation residue.

*Example 3*

An aqueous pulp of 136 kilograms of calcium sulphate is introduced into a pressure-autoclave which is provided with a stirring and a cooling device. 100 kilograms of a mixture of 75 parts of ammonia and 25 parts of trimethylamine are introduced. After mixing intensely about 40 kilograms of carbon dioxide are pumped into the autoclave (i. e., an amount which is not quite sufficient to convert the said amount of calcium sulphate into calcium carbonate). The mixture is stirred for some time at the temperature resulting from the heat developed by the reaction (about 60° C.). The mixture is then introduced into the still of a pressure distillation column and fractional distillation is carried out, cooling water of ordinary temperature being employed for the dephlegmator and condenser; a mixture of 40 kilograms of ammonia and 13 kilograms of trimethylamine distills over under a pressure of 12 atmospheres. The pressure falls then to 1.5 atmospheres whereupon 7 kilograms of pure trimethylamine distill over.

What we claim is:—

1. The process of recovering trimethylamine from a mixture containing substantially only the same and a major amount of ammonia, which comprises adjusting the basicity of the said mixture so that an appreciable amount of trimethylamine is in the free state, and that at least a substantial part of the ammonia is neutralized by an acid capable of forming a difficulty volatilizable ammonium salt and furthermore that the ratio of free ammonia to trimethylamine in the adjusted mixture is less than corresponds to the azeotropic ammonia-trimethylamine mixture, and subjecting the non-neutralized basic material to fractional distillation.

2. The process of recovering trimethylamine from a mixture containing substantially only free trimethylamine and a major amount of free ammonia, which comprises adding to the said mixture an acid capable of forming a difficulty volatilizable ammonium salt, said acid being added in an amount insufficient for neutralizing an appreciable amount of trimethylamine but sufficient for neutralizing so much ammonia that the ratio of free ammonia to trimethylamine in the acid-treated mixture is less than corresponds to the azeotropic ammonia-trimethylamine mixture, and subjecting the non-neutralized basic material to fractional distillation.

3. The process of recovering trimethylamine from a mixture containing substantially only free trimethylamine and a major amount of free ammonia, which comprises adding to the said mixture an acid capable of forming a difficulty volatilizable ammonium salt, said acid being added in an amount which is insufficient for neutralizing an appreciable amount of trimethylamine but sufficient for neutralizing so much ammonia that the ratio of free ammonia to trimethylamine in the acid-treated mixture is less than corresponds to the azeotropic ammonia-trimethylamine mixture, separating the neutralized part from the non-neutralized basic material and subjecting the latter to fractional distillation.

4. The process of recovering trimethylamine from a mixture containing substantially only free trimethylamine and a major amount of free ammonia, which comprises adding to the said mixture an acid capable of forming a difficulty volatilizable ammonium salt, said acid being added in an amount insufficient for neutralizing an appreciable amount of trimethylamine but sufficient for neutralizing so much ammonia that the ratio of free ammonia to trimethylamine in the acid-treated mixture is less than corresponds to the azeotropic ammonia-trimethylamine mixture, and subjecting the non-neutralized basic material to fractional distillation under superatmospheric pressure.

5. The process of recovering trimethylamine from a mixture containing substantially only free trimethylamine and a major amount of free ammonia, which comprises adding to the said mixture an acid capable of forming a difficulty volatilizable ammonium salt, said acid being added in an amount insufficient for neutralizing an appreciable amount of trimethylamine but sufficient for neutralizing practically all the ammonia, and subjecting the non-neutralized basic material to fractional distillation under superatmospheric pressure.

6. The process of recovering trimethylamine from a mixture containing substantially only free trimethylamine and free ammonia with the ratio of free ammonia to trimethylamine greater than corresponds to the azeotropic ammonia-trimethylamine mixture under a given superatmospheric pressure, which comprises adding to the said mixture an acid capable of forming a difficultly volatilizable ammonium salt, said acid being added in an amount insufficient for completely neutralizing the ammonia present but sufficient for neutralizing so much thereof that the ratio of free ammonia to trimethylamine in the mixture is less than corresponds to the azeotropic ammonia-trimethylamine mixture, and subjecting the non-neutralized basic material to fractional distillation under the said superatmospheric pressure.

PAUL HEROLD.
WERNER WUSTROW.